United States Patent [19]
Palumbo et al.

[11] Patent Number: 5,684,869
[45] Date of Patent: Nov. 4, 1997

[54] TELEPHONE STATION REMOTE ACCESS DEVICE AND METHOD

[75] Inventors: Nicholas P. Palumbo, Old Bridge; Randall J. Penning, Middletown, both of N.J.

[73] Assignee: Lucent Technologies, Inc., Murray Hill, N.J.

[21] Appl. No.: 579,516

[22] Filed: Dec. 27, 1995

[51] Int. Cl.$^6$ .................................................. H04M 3/54
[52] U.S. Cl. ...................... 379/182; 379/177; 379/67; 379/157; 379/199; 370/264
[58] Field of Search ...................... 379/67, 88, 89, 379/69, 70, 117, 177, 180, 182, 183, 157, 199, 178, 179, 181, 184; 370/110.1

[56] References Cited

U.S. PATENT DOCUMENTS

| | | | |
|---|---|---|---|
| 5,208,849 | 5/1993 | Fu | 379/211 |
| 5,297,183 | 3/1994 | Bareis et al. | 379/67 |
| 5,305,312 | 4/1994 | Fornek et al. | 379/93 |
| 5,422,936 | 6/1995 | Atwell | 379/211 |
| 5,452,347 | 9/1995 | Iglehart et al. | 379/199 |

OTHER PUBLICATIONS

"Your Wildfire Electronic Assistant," Wildfire Communiations, Inc., Lexington, Massachusetts, 1995.

*Primary Examiner*—Fan Tsang

[57] ABSTRACT

The invention provides a remote access telephone system that includes a telephone station which has two access numbers. The remote access telephone system responds to a first one of the two access numbers by providing remote access features and responds to a second one of the two access numbers by providing normal access features. The remote access telephone system also includes a remote access controller that prevents a remote caller from having access to the telephone station unless the remote caller dials a valid password. The remote access features includes remote dialing a number recalled from a directory memory based on a second party name spoken by the remote caller. A remote directory feature is provided when the remote caller speaks a remote directory command and a name. The remote access controller recalls a number corresponding to the name and outputs the number to the remote caller.

18 Claims, 6 Drawing Sheets

TELEPHONE STATION REMOTE ACCESS DEVICE AND METHOD

BACKGROUND OF THE INVENTION

1. Field of the Invention

This invention relates to a device and method for providing a remote telephone station an ability to remotely access and control a different telephone station.

2. Description of Related Art

Modern telephone stations include many useful features to assist a user to remember telephone station information. For example, a directory memory feature stores a large number of directory entries including information such as names, corresponding telephone numbers, account numbers, and so on.

When the user is in a remote location away from the telephone station, the user cannot access the information stored in the directory memory or have access to any of the functional features of the telephone station such as dialing a number stored in the directory memory. Thus, there is a need to provide an effective method for the user to access the telephone station when the user is at a remote location.

SUMMARY OF THE INVENTION

The invention provides a remote access telephone system that includes a telephone station which has two access numbers. The remote access telephone system responds to a remote caller based upon one of the two access numbers dialed by the remote caller. If the remote caller dials a first one of the two access numbers the telephone system provides remote access features to the remote caller. If the remote caller dials a second one of the two access numbers, the telephone system provides normal access features to the remote caller.

The invention also provides a remote access telephone system method for performing remote access telephone functions. The method includes providing remote access features of the telephone station to the remote caller if the remote caller dials the first one of the two access numbers. The method further includes providing normal access features of the telephone station to the remote caller if the remote caller dials the second one of the two access numbers.

BRIEF DESCRIPTION OF THE DRAWINGS

The invention will be described in detail with reference to the following drawings, wherein like numerals represent like elements and.

DETAILED DESCRIPTION OF PREFERRED EMBODIMENTS

Figure 1:
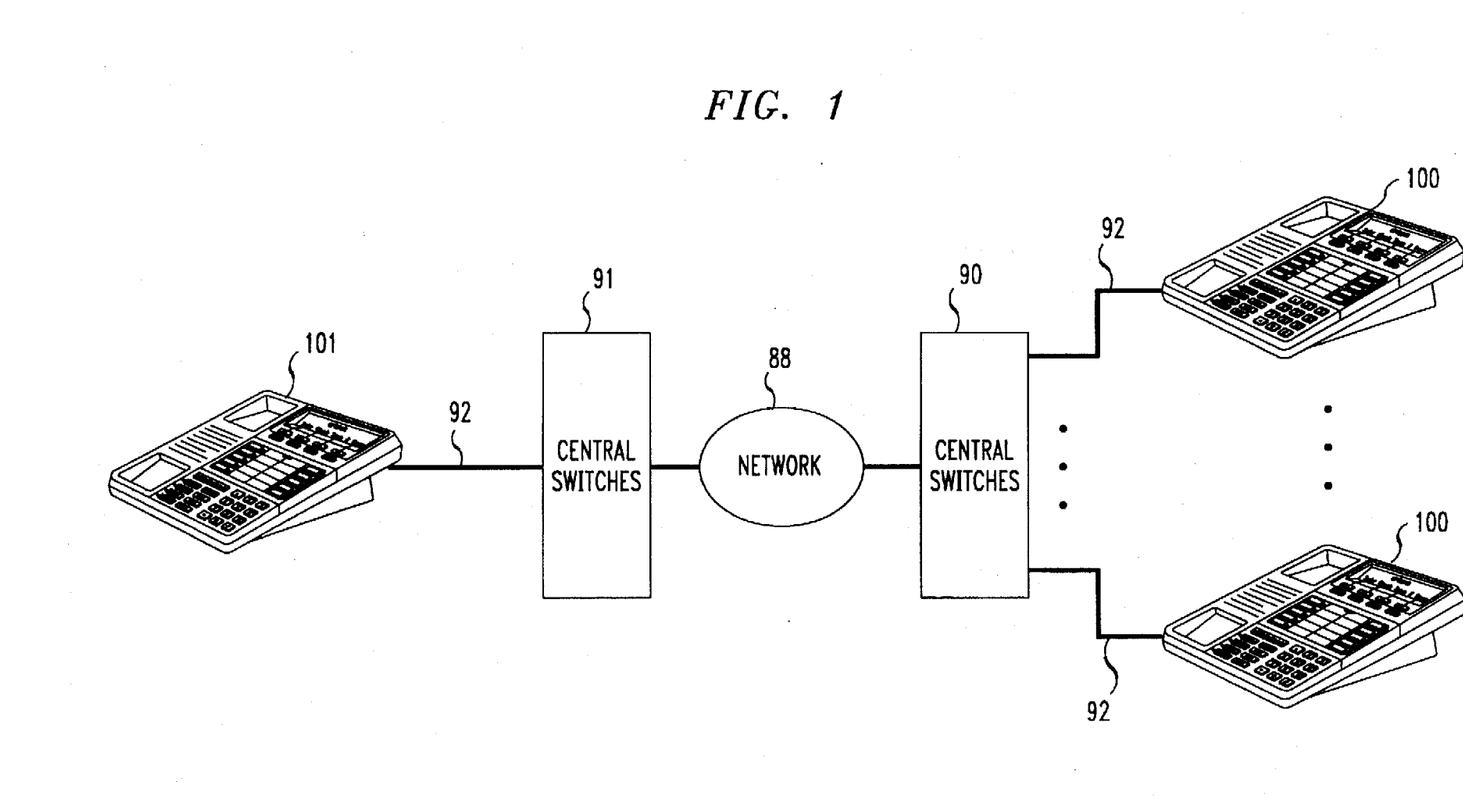
FIG. 1 is a block diagram of a remote telephone station coupled to a plurality of telephone stations through a network and central switches.

FIG. 1 shows a block diagram including a plurality of telephone stations 100 and a remote telephone station 101 connected through a network 88 and central switches 90 and 91. Each of the central switches 90 and 91 may be a switch such as a private branch exchange (PBX). Each of the telephone stations 100 and 101 is connected to central switches 90 and 91, respectively, through signal lines 92. Each of the signal lines 92 includes at least one bearer channel and one signaling channel. The bearer channel carries digital or analog audio and/or application level data while the signaling channel carries inter-processor data. The telephone station 101 may also be an analog station and may not require separate bearer and signaling channels for the signal line 92.

Figure 2:
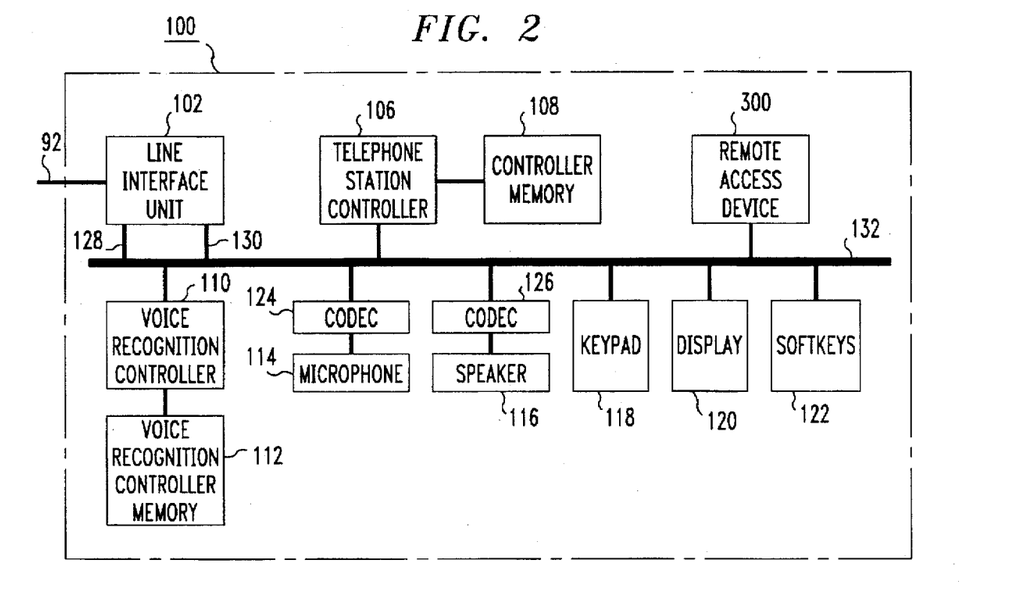
FIG. 2 is a block diagram of a remotely accessible telephone station.

FIG. 2 shows a block diagram of the telephone station 100. The signal line 92 is input to the line interface unit 102. The line interface unit 102 converts the signal line 92 into one or more bearer channels 128 and a signaling channel 130. The signaling channel 130 contains information indicating that a caller has dialed the telephone station 100. The telephone station controller 106 scans the data on the signaling channel 130 through signal line 132. The signal line 132 interconnects the components of the telephone station 100 together.

When the telephone station controller 106 detects that the telephone station 100 has been called, the telephone station controller 106 determines whether the telephone station 100 is called using a normal number or a remote access number. If a normal number is used, the telephone station 100 activates the telephone ringer (not shown). When the user takes the telephone station 100 off-hook, the user is connected to the bearer channel 128 of the line interface unit 102 for conventional audio communication. If the remote access number is used, a remote access device 300 takes control and processes the remote access call.

The voice recognition controller 110 connected to the signal line 132 also scans the signaling channel 130. When the voice recognition controller 110 detects special codes on the signaling channel 130, it accesses the bearer channel 128 and communicates with the remote caller by outputting audio voice data and receiving audio voice commands from the caller.

Since the voice recognition controller 110 and the telephone station controller 106 can interface directly with the bearer channel 128, two bearer channels 128 may be provided so that the voice recognition controller 110 and the telephone station controller 106 can both communicate through the two bearer channels 128 at the same time.

The voice recognition controller 110 and the telephone station controller 106 operate concurrently. However, if only one bearer channel 128 is available, then the voice recognition controller 110 and telephone station controller 106 cannot communicate through the single bearer channel 128. Thus, having two bearer channels 128 allows the voice recognition controller 110 and the telephone station controller 106 to communicate concurrently.

The remote access device 300 also operate concurrently with the telephone station controller 106 and the voice recognition controller 110. The remote access device 300 and the telephone station controller 106 can share a single bearer channel 128. Since the remote caller can access the telephone station 100 using either the normal access number or the remote access number, only one of the telephone station controller 106 and the remote access device 300 responds to the remote caller and has control of the bearer channel 128 at any one time. Accordingly, two bearer channels is sufficient to satisfy the needs of the voice recognition controller 110, the telephone station controller 106 and the remote access device 300.

A user interface with the telephone station 100 through user interfaces such as a microphone 114, a speaker 116, a keypad 118, a display device 120, and soft keys 122 or through the bearer channel 128 when the user calls from the remote telephone station 101. The user interfaces are coupled to the signal line 132 and are accessible by telephone station elements such as the voice recognition controller 110, the telephone station controller 106 and the remote access device 300. The microphone 114 and the speaker 116 are connected to the signal line 132 through two CODEC (Coder Decoder) units 124 and 126, respectively.

Figure 3:
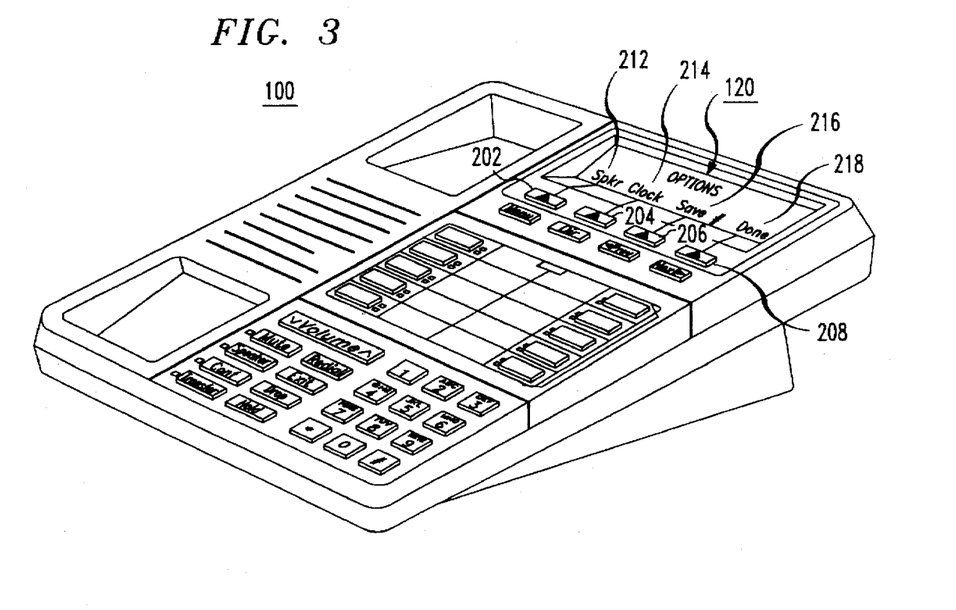
FIG. 3 is a diagram of soft keys.

FIG. 3 shows the display device 120 that has option display areas 212, 214, 216 and 218. Soft keys 202, 204, 206 and 208 are located close to the corresponding option selections displayed on the display device 120. The user selects the displayed option by simply pushing the corresponding soft key 202-208.

The voice recognition controller 110 also receives audio data over the bearer channel 128. When the user speaks a voice command through the remote telephone station 101, the voice recognition controller 110 determines if the user voice command matches one of the voice commands stored in the voice recognition controller memory 112. If the user voice command matches one of the stored voice commands, then the voice recognition controller 110 sends the command to the remote access device 300.

Figure 4:
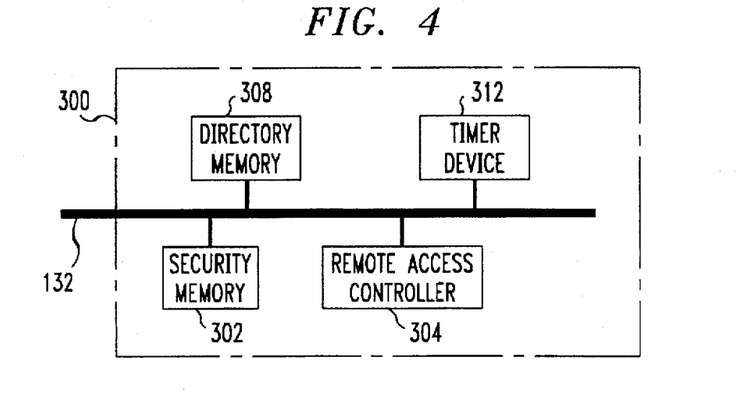
FIG. 4 is a block diagram of a remote access device.

FIG. 2 shows the remote access device 300 connected to the signal line 132. FIG. 4 shows the remote access device 300 in greater detail. The remote access device 300 includes a directory memory 308, a security memory 302, a timer device 310 and a remote access controller 304. The remote access controller 304 controls the timer device 310 and the security memory 302 and communicates with the voice recognition controller 110 through the signal line 132.

In preferred embodiments, each telephone station 100 is assigned two numbers. A first number (a remote access number) is assigned to the telephone station 100 to specifically identify the call as a remote access call and a second number provides for normal telephone communication. The remote access controller 304 scans the signalling channel 130 to determine if the remote access number is dialed to access the telephone station 100. If the remote access number is dialed, the remote access controller 304 determines if the telephone station 100 is already busy with another call. If the telephone station 100 is busy with another call, the remote access controller 304 ignores the remote access call.

If the telephone station 100 is not busy, the remote access controller 304 mutes the user interface device including the microphone 114, the speaker 116, the keypad 118, and soft keys 122. Thus, during the remote access mode the telephone station 100 stops communicating through the user interface device and communicates only to the remote caller through the bearer channel 128.

After the remote access controller 304 mutes the user interface device, the telephone station 100 is taken off-hook and connects with the remote caller. The remote access controller 304 first determines whether a security check is required. The owner of the telephone station 100 may initialize the remote access controller 304 to enforce security procedures. If a security check is required, the remote access controller 304 requests the remote caller to enter a password. The remote caller may enter the password by dialing the digits or speak the password. If the remote caller speaks the password, the voice print corresponding to the remote caller is used to verify the authenticity of the remote caller. If the entered password matches a password previously stored in the security memory 302, the remote access controller 304 outputs a remote command prompt to the remote caller and requests the remote caller to activate a telephone station feature. If the password entered by the remote caller is incorrect, the remote access controller 304 increments a counter and provide the remote caller further opportunities to enter a correct password. The remote access controller 304 allows a preset number of incorrect passwords before ending the remote access mode and returns the telephone station 100 to on-hook.

The remote access controller 304 provides various features such as a remote dial feature and a remote directory feature. Depending on the specific telephone station 100, the remote dial feature may not be available. However, when the telephone station 100 supports the remote dial feature, the remote access controller 304 initiates the remote dial feature when the remote caller speaks a name of a second party.

When the remote caller speaks the name of the second party, the remote access controller 304 receives the resulting voice print and waits for the voice recognition controller 110 to indicate whether a voice command is received. If the voice recognition controller 110 determines that the voice print is not a voice command, then the remote access controller 304 receives the voice print as a request to activate the remote dial feature and treats the voice print as the name of the second party. Otherwise, the remote access controller 304 performs the functions requested by the received voice command.

The remote controller 304 begins a remote dial process by searching the directory memory 308 for a directory entry that contains a voice print that matches the voice print received from the remote caller. When a matching voice print is found, the remote access controller 304 recalls a corresponding number as the second party number and outputs the voice print recalled from the directory memory 308 to the remote caller. This gives the remote caller an opportunity to verify that the remote access controller 304 recalled the desired directory entry. Then, the remote controller 304 waits for a preset amount of time to provide the remote caller a chance to cancel the remote dial process. The remote caller cancels the remote dial process either by speaking a cancel voice command or by pushing a key of the keypad 118 or a soft key 112 to output a predesignated signal to the telephone station 100. If the user cancels the remote dial process, the remote access controller 304 prompts the remote caller for another selection of telephone station features.

The remote access controller 304 then determines whether an additional free bearer channel 128 is available to establish a connection to the second party. If a bearer channel 128 is available, the remote access controller 304 takes the available bearer channel 128 off-hook and dials the second party number. When a connection to the second party is established, the remote access controller 304 connects the remote caller directly to the second party and then monitors the status of both the remote caller bearer channel 128 and the second party bearer channel 128 to detect when the call has ended.

If an additional free bearer channel is not available, the remote access controller 304 invokes a conference feature of the central switch 90 that is connected to the telephone station 100. The remote access controller 304 sends the second party number to the central switch 90 and the central switch 90 establishes a connection with the second party. After the central switch 90 initiates the connection with the second party, the remote access controller 304 establishes the conference call between the remote caller and the second party through the central switch 90 and disconnects the call to the telephone station 100.

The call between the remote caller and the second party ends either when one or both the remote caller and the second party go on-hook or when the remote caller issues a verbal "end-call" command. When the "end-call" command is received, the remote access controller 304 outputs an ending call message to the remote caller and then sets a timer device 312 to expire in a predetermined amount of time. The remote caller can issue a cancel command to cancel the on-hook command before the timer device 312 expires and continue the call to the second party. If the timer device 312 expires before a cancel command is received, the remote access controller 304 disconnects the second party from the call. The connection with the remote caller remains established.

The call between the remote caller and the second party ends when the second party is disconnected from the telephone station 100. When an on-hook is received from the second party, the remote access controller 304 outputs a call ending message to the remote caller. The remote access controller 304 queries whether the user would like another selection of the telephone station features.

The remote access controller 304 ends the remote access mode anytime the remote caller goes on-hook or for any reason is disconnected from the telephone station 100. If the call to the second party is ended and the remote caller is still connected, the remote access controller 304 queries whether the user would like another selection of the telephone station features.

When the remote caller selects the remote directory feature by speaking the remote directory voice command, the remote access controller 304 responds by requesting the remote caller to speak the name of the directory entry. The remote access controller 304 receives the voice print from the remote caller and recalls a number corresponding to the voice print from the directory memory 308 and outputs the number to the user.

If the remote dial feature is available, the remote access controller 304 then queries whether the user would like to dial the number recalled from the directory memory 308. If the caller desires to use the remote dial feature, the remote access controller 304 dials the number recalled from the directory memory 308 as a second party number and connects the remote caller with the second party.

In another preferred embodiment, the central switch 90 that is connected to the telephone station 100 and the remote access controller 304 together provide the remote access feature. The remote access number is answered by the central switch 90. If the remote caller dialed the remote access number, the central switch 90 returns a second dial tone to the remote caller. The remote caller then dials an extension number of the telephone station 100 in response to the returned dial tone. The central switch 90 receives the extension number and checks if security is required for the dialed telephone station 100. If security is required, the central switch requests the remote caller to enter a valid password before connecting the remote caller to the dialed telephone station 100. If a valid password is entered, the central switch 90 connects the remote caller to the telephone station 100. Otherwise, the central switch 90 disconnects the remote caller and ends the remote access process.

Figure 5:
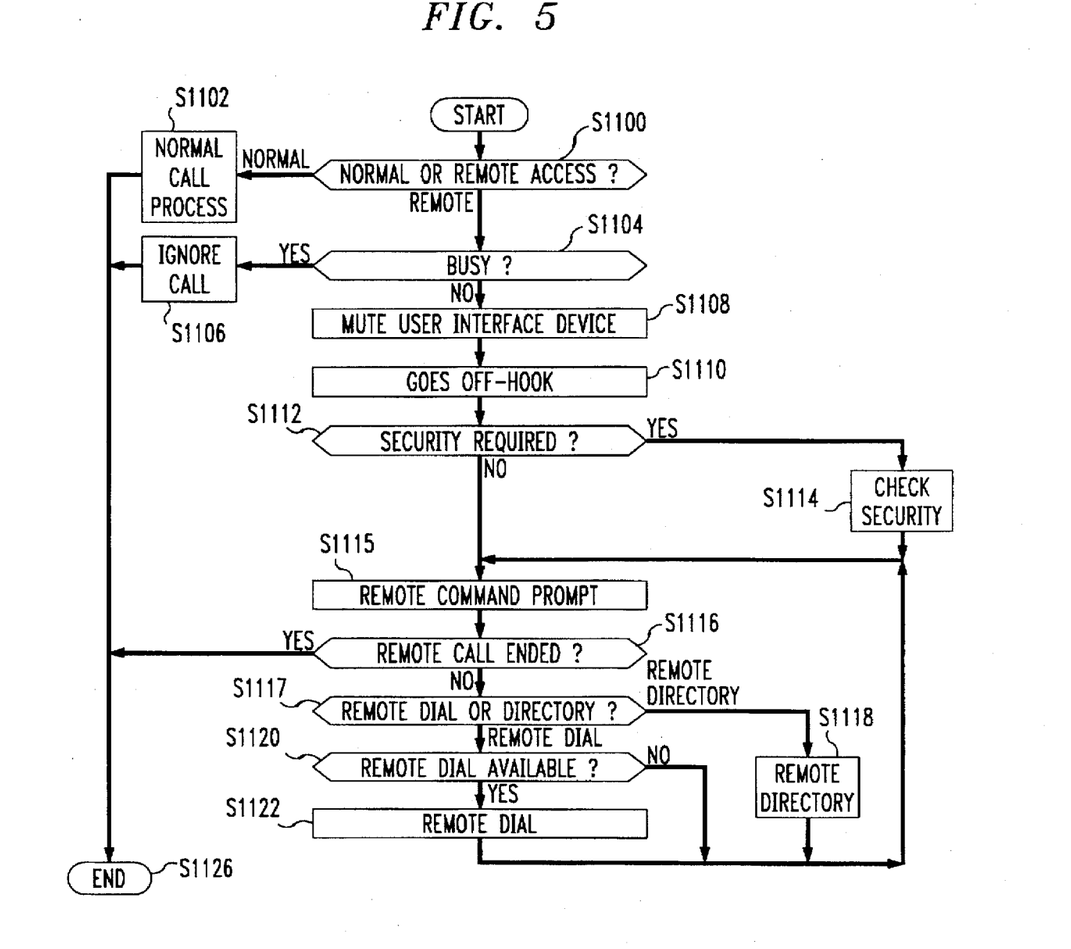
FIG. 5 is a flowchart of a remote access process in a telephone station.

FIG. 5 is a flowchart of the remote access process of a telephone station 100. In step S1100, the remote access controller 304 determines whether the incoming call is a normal call or a remote access call. If the incoming call is a normal call, the remote access controller 304 goes to step S1126. Otherwise, the remote access controller 304 goes to step S1104. In step S1126, the remote access controller 304 ends the remote access process.

In step S1104, the remote access controller 304 determines whether the telephone station 100 is busy. If the telephone station 100 is busy, the remote access controller 304 goes to step S1126. Otherwise, the remote access controller 304 goes to step S1108. In step S1108, the remote access controller 304 mutes the user interface device so that all communications to the local user is terminated. Then, the remote access controller 304 goes to step S1110. In step S1110, the remote access controller 304 takes the telephone station 100 off-hook and answers the remote caller. Then, the remote access controller 304 goes to step S1112.

In step S1112, the remote access controller 304 determines whether security check is required. If security check is required, the remote access controller 304 goes to step S1114. Otherwise, the remote access controller 304 goes to step S1115. In step S1114, the remote access controller 304 performs a security check and then goes to step S1115.

In step S1115, the remote access controller 304 prompts the user to select either the remote dial feature or the remote directory feature and then goes to step S1116. In step S1116, the remote access controller 304 queries whether the remote caller would like to end the remote access. If the remote caller chooses to end the remote access, the remote access controller goes to step S1126. Otherwise, the remote access controller 304 goes to step S1117.

In step S1117, the voice recognition controller 110 determines whether the remote directory voice command is received from the remote caller. If the remote directory voice command is received, the voice recognition controller 110 sends the command to the remote access controller 304. If the voice print of the remote caller is not a voice command, the remote access controller 304 goes to step S1120. Otherwise, the remote access controller 304 goes to step S1118.

In step S1120, the remote access controller 304 determines whether the remote dial feature is available. If the remote dial feature is not available, the remote access controller 304 returns to step S1115 and prompts the remote caller for another selection of the telephone station features. Otherwise, the remote access controller 304 goes to step S1122. In step S1122, the remote access controller 304 performs a remote dial process and then returns to step S1115. In step S1118, the remote access controller 304 performs a remote directory process and then returns to step S1115.

Figure 6:
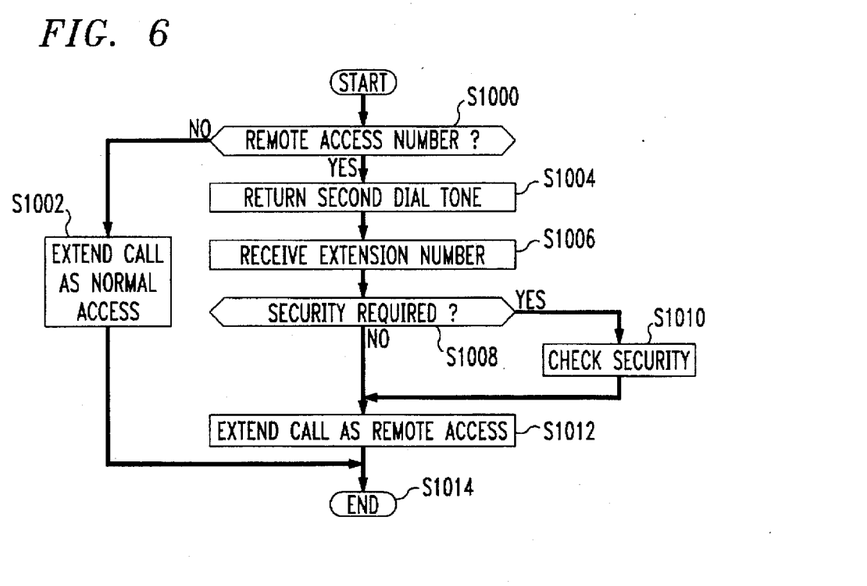
FIG. 6 is a flowchart of a remote access process in a central switch.

FIG. 6 is a flowchart of the process for the central switch 90 to process a remote access call. In step S1000, the central switch 90 determines whether the remote caller dialed a remote access number or a normal access number. If the remote caller dialed a remote access number, the central switch 90 goes to step S1004. Otherwise, the central switch 90 goes to step S1002.

In step S1002, the central switch 90 extends the call as a normal access call to the telephone station 100 and then goes to step S1014 and ends the remote access process. In step S1004, the central switch 90 returns a dial tone to the remote caller and then goes to step S1006. In step S1006, the central switch 90 receives the extension number from the remote caller and then goes to step S1008.

In step S1008, the central switch 90 determines whether security check is required for the extension number dialed by the remote caller. If a security check is required, the central switch 90 goes to step S1010. Otherwise, the central switch 90 goes to step S1012. In step S1010, the central switch 90 performs a security check and goes to step S1012. In step S1012, the central switch 90 extends the call as a remote access call to the telephone station 100. Then, the central switch 90 goes to step S1014 and ends the central switch portion of the remote access process.

Figure 7:
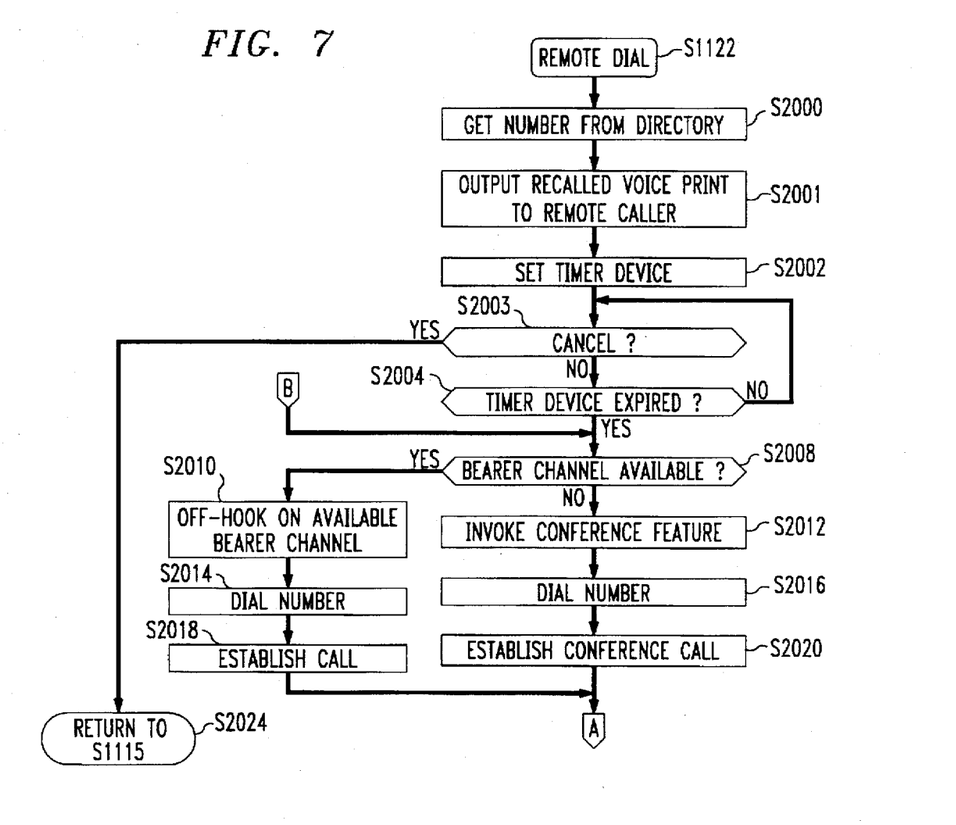
FIG. 7 is a flowchart of a remote dial process.

FIG. 7 shows the remote dial process in greater detail. In step S2000, the remote access controller 304 uses the remote caller voice print as a name of a second party to be called and recalls a number and a voice print corresponding to the second party name from the directory memory 308. Then, the remote access controller 304 goes to step S2001. In step S2001, the remote access controller 304 outputs the recalled voice print to the remote caller and then goes to step S2002. In step S2002, the remote access controller 304 sets the timer device 312 to expire in a predetermined amount of time to wait for the cancel command and then goes to step S2003.

In step S2003, the remote access controller 304 determines whether the remote caller has issued the cancel command. If the cancel command is issued, the remote access controller 304 goes to step S2024 and returns to the step S1115 following the calling step. Otherwise, the remote access controller 304 goes to step S2004. In step S2004, the remote access controller 304 determines whether the timer device 312 has expired. If the timer device 312 has not expired, the remote access controller 304 returns to step S2003. If the timer has expired, the remote access controller goes to step S2008.

In step S2008, the remote access controller 304 determines whether a bearer channel 128 is available to dial the second party number. If an additional bearer channel 128 is available, the remote access controller 304 goes to step S2010. Otherwise, the remote access controller 304 goes to step S2012.

In step S2010, the remote access controller 304 takes the available bearer channel off-hook and goes to step S2014. In step S2014, the remote access controller 304 dials the second party number and then goes to step S2018. In step S2018, the remote access controller 304 connects the remote caller with the second party and then goes to step S2100 through connector A for an ending call process shown in FIG. 8.

In step S2012, the remote access controller 304 invokes the conference call feature of the central switch 90 and then goes to step S2016. In step S2016, the remote access controller 304 transfers the second party number to the central switch 90 for dialing the second party number and then goes to step S2020. In step S2020, the remote access controller 304 receives from the central switch 90 the connection to the second party. After receiving the connection to the second party, the remote access controller 304 establishes a conference call between the remote caller and the second party and then goes to step S2100 through connector A for the ending call process shown in FIG. 8.

Figure 8:
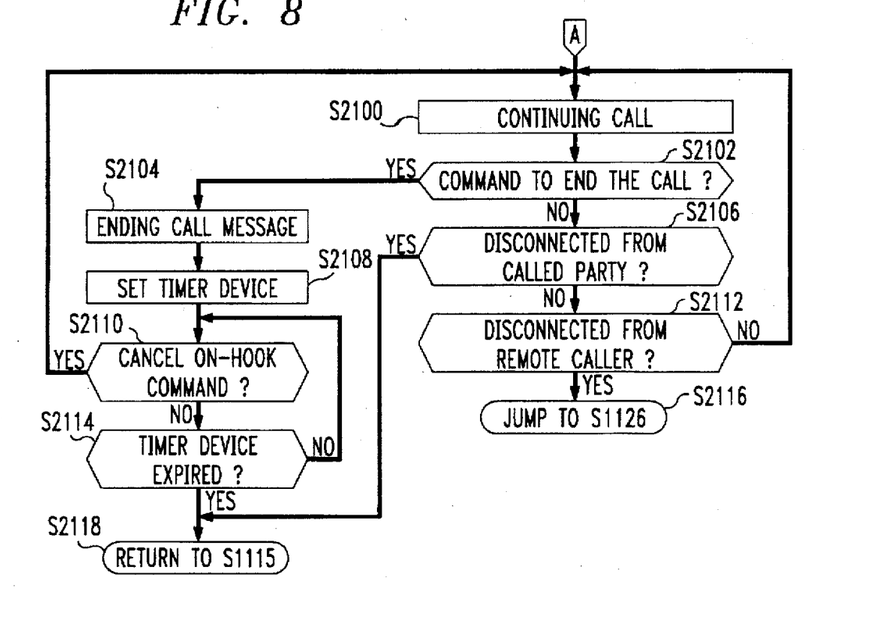
FIG. 8 is a flowchart of an ending call process.

FIG. 8 is a flowchart of the ending call process starting with the connector A from FIG. 7. In step S2100, the remote access controller 304 continues the call between the remote caller and the second party and then goes to step S2102. In step S2102, the remote access controller 304 determines whether the remote caller has issued a command to "end the call" with respect to the second party. If the command to "end the call" is received, the remote access controller 304 goes to step S2104. Otherwise, the remote access controller 304 goes to step S2106.

In step S2104, the remote access controller 304 outputs an ending call message to the remote caller and then goes to step S2108. In step S2108, the remote access controller 304 sets the timer device 312 to expire in a predetermined amount of time to allow the remote caller to cancel the "end the call" command. Then, the remote access controller 304 goes to step S2110. In step S2110, the remote access controller 304 determines whether the cancel command has been received. If the cancel command has been received, the remote access controller 304 goes to step S2100. Otherwise, the remote access controller 304 goes to step S2114. In step S2114, the remote access controller 304 determines whether the timer device 312 has expired. If the timer device 312 has not expired, the remote access controller 304 goes to step S2110. Otherwise, the remote access controller 304 goes to step S2118 and returns to the step S1115 following the calling step.

In step S2106, the remote access controller 304 determines whether the second party has been disconnected. If the second party has been disconnected, the remote access controller 304 goes to step S2118 and returns to the step S1115 following the calling step. Otherwise, the remote access controller 304 goes to step S2112.

In step S2112, the remote access controller 304 determines whether the remote caller has been disconnected. If the remote caller has not been disconnected, the remote access controller 304 goes to step S2100. Otherwise, the remote access controller 304 goes to step S2116 which jumps to step S1126 shown in FIG. 5 and ends the remote access process.

Figure 9:
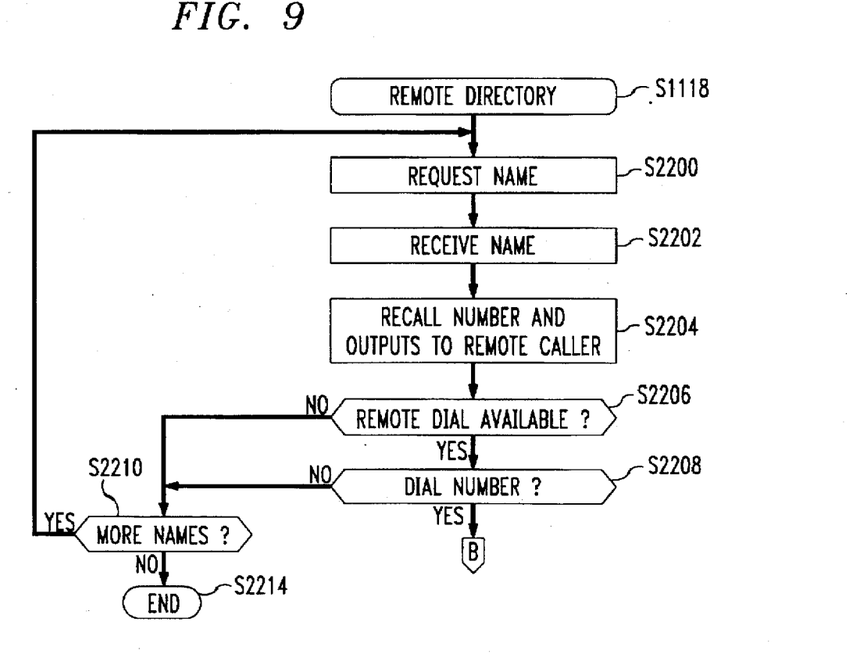
FIG. 9 is a flowchart of a remote directory process.

FIG. 9 is a flowchart of the remote directory process. In step S2200, the remote access controller 304 requests the remote caller to speak the name of the directory entry and then goes to step S2202. In step S2202, the remote access controller 304 receives the voice print from the remote caller and then goes to step S2204. In step S2204, the remote access controller 304 recalls the number corresponding to the voice print from the directory memory 308 and outputs the number to the remote caller. Then, the remote access controller 304 goes to step S2206.

In step S2206, the remote access controller 304 determines whether the remote dial feature is available on the telephone station 100. If the remote dial feature is not available, the remote access controller 304 goes to step S2210. Otherwise, the remote access controller 304 goes to step S2208.

In step S2208, the remote access controller 304 queries whether the remote caller desires to dial the number recalled from the directory memory 308. If the remote caller decides to dial the number, the remote access controller 304 goes to step S2008 of the remote dial process shown in FIG. 7 through connector B. Otherwise, the remote access controller 304 goes to step S2210.

In step S2210, the remote access controller 304 queries whether the remote caller desires more numbers from the directory memory 308. If the remote caller desires more numbers from the directory memory, the remote access controller 304 goes to step S2200. Otherwise, the remote access controller 304 goes to step S2214 and ends the remote access process.

Figure 10:
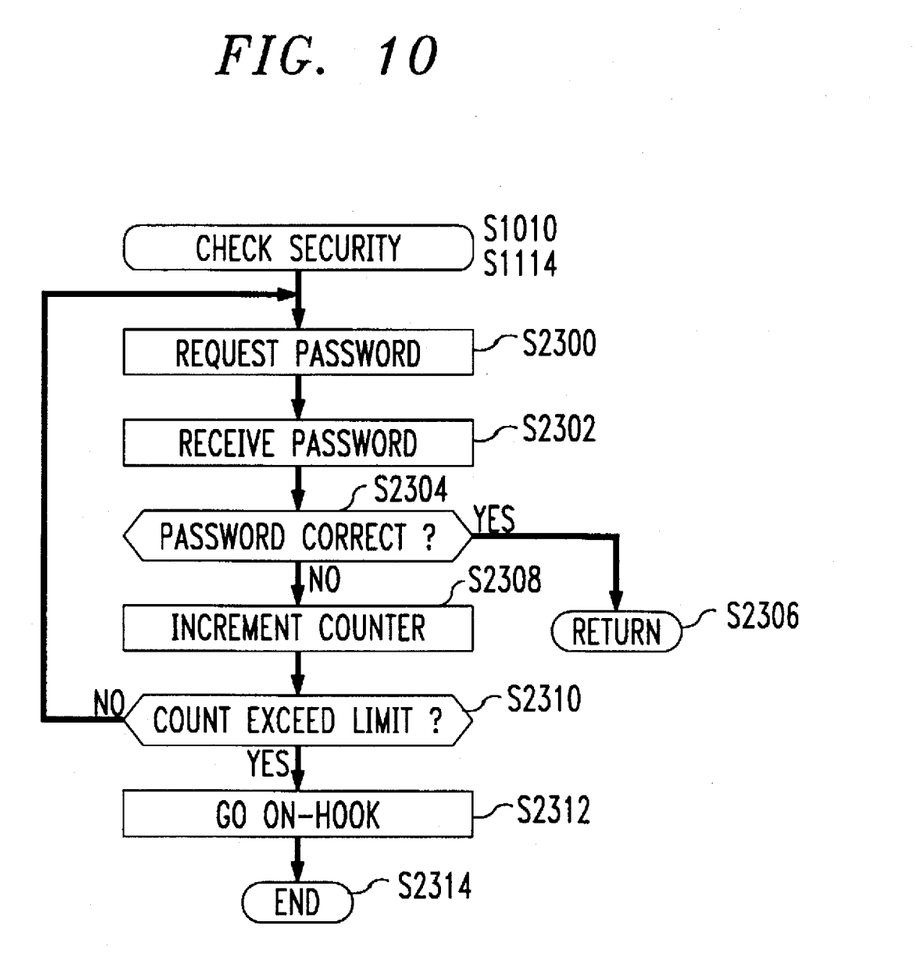
FIG. 10 is a flowchart of a check security process.

FIG. 10 is a flowchart of the check security process of steps S1010 and S1114. In step S2300, the remote access controller 304 or the central switch 90 requests a password from the remote caller and then goes to step S2032. In step S2032, the remote access controller 304 or the central switch 90 receives the password from the remote caller and goes to step S2304.

The password can be either entered by the remote caller through the dialpad of the remote telephone station 101 or spoken by the remote caller. If the password is spoken by the remote caller, the remote access controller 304 or the central switch 90 uses a corresponding voice print from the bearer channel 128 to verify the remote caller's authority.

In step S2304, the remote access controller 304 or the central switch 90 determines whether the remote caller password is correct. The remote access controller 304 compares the password entered by the remote caller with passwords stored in the security memory 302. The control switch 90 has a password memory (not shown) similar to the security memory 302 and compares the password entered by the remote caller to passwords in the password memory. If the password entered by the remote caller is correct, the remote access controller 304 or the central switch 90 goes to step S2306 and returns to the step following the calling step. Otherwise, the remote access controller 304 or the central switch 90 goes to step S2308.

In step S2308, the remote access controller 304 or the central switch 90 increments a counter and then goes to step S2310. In step S2310, the remote access controller 304 or the central switch 90 determines whether the counter has exceeded a preset limit. If the counter has not exceeded the preset limit, the remote access controller 304 or the central switch 90 goes to step S2300. Otherwise, the remote access controller 304 or the central switch 90 goes to step S2312 and disconnects the remote caller by going on-hook and then goes to step S2314 and ends the remote access process.

The remote access device 300 may be embodied in hardware using dedicated components to implement the timer device 312, the security memory 302, the directory memory 308 and the remote access controller 304. Application specific integrated circuits (ASIC) may also be used for each of the components listed above. Portions of each component may be combined into different ASICs for optimum performance characteristics.

If the voice recognition controller 110 is a high powered processor such as a digital signal processor (DSP), the complete remote access device 300 may be implemented as a program executed by the voice recognition controller 110. Alternately, the telephone station controller 106 in conjunction with the controller memory 108 may also implement the remote access device functions.

While this invention has been described in conjunction with the specific embodiment thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A remote access telephone system for a telephone station, comprising two access numbers of a single line, the remote access telephone system responding to a call based upon one of the two access numbers, wherein if a first one of the two access numbers is dialed for the call, the telephone system provides to the call access to remote access features of the telephone station and if a second one of the two access numbers is dialed for the call, the telephone system provides to the call access to normal features available to any call.

2. The remote access telephone system of claim 1, wherein the telephone station comprises a remote access controller that provides the remote access features and a telephone station controller that provides the normal features.

3. The system of claim 2, further comprising a security memory coupled to the remote access controller, wherein the remote access controller prevents access to the telephone station unless a valid password that is stored in the security memory is entered by the call, the valid password being entered by one of dialing the valid password and speaking the valid password.

4. The system of claim 2, further comprising a directory memory coupled to the remote access controller, wherein if a second party name is spoken, the remote access controller recalls a second party number from the directory memory corresponding to the second party name and dials the second party number, wherein the remote access controller connects the call to a second party by one of using an additional bearer channel of the telephone station and invoking a conference feature of a switch.

5. The system of claim 2, further comprising a directory memory coupled to the remote access controller, wherein if a remote directory feature is requested and a name is spoken, the remote access controller recalls a number corresponding to the name and outputs the number to the call.

6. The system of claim 5, wherein the remote access controller dials the number recalled from the directory memory.

7. The system of claim 2, further comprising a user interface device coupled to the remote access controller, wherein the remote access controller mutes the user interface device while providing the remote access features.

8. The system of claim 2, wherein the remote access controller and the telephone station controller are embodied by hardware units.

9. The system of claim 2, wherein the remote access controller and the telephone station controller are programs executed by a processor.

10. The system of claim 1, further comprising a switch connected to the telephone station, the switch returning a dial tone to the call after the first one of the two access numbers is dialed, an extension number being dialed to access the telephone station in response to the dial tone, wherein if the first one of the two access numbers is dialed, then the switch extends to the telephone station a remote call connection for accessing remote access features, and if the second one of the two access numbers is dialed, then the switch extends to the telephone station a normal call connection for accessing normal features available to any call.

11. The system of claim 10, wherein access to the telephone station is prevented by the switch unless a valid password is entered by the call, the valid password being entered by one of dialing the valid password and speaking the valid password.

12. A remote access telephone system method for performing remote access telephone functions, the remote access telephone system including a telephone station which has two access numbers of a single line, the method comprising:

providing to a call access to remote access features of the telephone station if a first one of two access numbers is dialed; and providing to a call access to normal features of the telephone station available to any call if a second one of the two access numbers is dialed.

13. The method of claim 12, wherein the providing remote access features step comprises preventing access to the telephone station with a remote access controller unless a valid password that is stored in a security memory is entered by the call, the valid password being entered by one of dialing the valid password and speaking the valid password.

14. The method of claim 12, wherein providing remote access features comprises:

recalling from a directory memory a second party number corresponding to a second party name if the second party name is spoken; and dialing the second party number, wherein the second party number is recalled and dialed by a remote access controller and the remote access controller connects the call to a second party by one of using an additional bearer channel of the telephone station and invoking a conferencing feature of a switch.

15. The method of claim 12, wherein providing remote access features comprises:

recalling a number from a directory memory corresponding to a name if a remote directory feature is requested and a name is spoken; and outputting the recalled number to the call, wherein the number is recalled and output by a remote access controller.

16. The method of claim 15, further comprising dialing the number recalled from the directory memory.

17. The method of claim 12, wherein providing remote access features comprises:

returning a dial tone to the call if a first one of the two access numbers is dialed; and extending a remote call to the telephone station after an extension number of the telephone station is dialed in response to the dial tone, wherein the dial tone is returned to the call and the remote call is extended to the telephone station by a switch.

18. The method of claim 17, wherein extending a remote call comprises the switch preventing access to the telephone station unless a valid password is entered, the valid password being entered by the call by one of dialing the valid password and speaking the valid password.

* * * * *